US010489000B2

(12) United States Patent
Chae et al.

(10) Patent No.: US 10,489,000 B2
(45) Date of Patent: Nov. 26, 2019

(54) DIGITIZER AND METHOD OF PREPARING THE SAME

(71) Applicant: DONGWOO FINE-CHEM CO., LTD., Iksan-si, Jeollabuk-do (KR)

(72) Inventors: Seung Jin Chae, Anyang-si (KR); Yoonho Huh, Seoul (KR); Byung Jin Choi, Incheon (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 100 days.

(21) Appl. No.: 15/901,974

(22) Filed: Feb. 22, 2018

(65) Prior Publication Data

US 2018/0246595 A1 Aug. 30, 2018

(30) Foreign Application Priority Data

Feb. 28, 2017 (KR) .......................... 10-2017-0026152

(51) Int. Cl.
*G06F 3/041* (2006.01)
*G06F 3/044* (2006.01)
*G06F 3/046* (2006.01)

(52) U.S. Cl.
CPC .............. *G06F 3/044* (2013.01); *G06F 3/046* (2013.01); *G06F 3/0416* (2013.01); *G06F 2203/04102* (2013.01); *G06F 2203/04103* (2013.01); *G06F 2203/04106* (2013.01)

(58) Field of Classification Search
CPC ................................. G06F 3/044; G06F 3/046
See application file for complete search history.

(56) References Cited

U.S. PATENT DOCUMENTS

| 8,743,086 | B2* | 6/2014 | Chen | G06F 3/044 |
| | | | | 178/18.06 |
| 8,780,081 | B2* | 7/2014 | Li | G06F 3/046 |
| | | | | 345/173 |
| 9,323,384 | B2* | 4/2016 | Kim | G06F 3/0416 |
| 9,535,558 | B2* | 1/2017 | Lu | G06F 3/0412 |
| 9,632,633 | B2* | 4/2017 | Ma | G06F 3/044 |
| 9,639,220 | B2* | 5/2017 | Wang | G06F 3/044 |
| 9,759,579 | B2* | 9/2017 | Liu | G01D 5/20 |
| 9,830,012 | B2* | 11/2017 | Yang | G06F 3/044 |
| 9,904,365 | B2* | 2/2018 | Son | G06F 3/016 |
| 9,933,902 | B2* | 4/2018 | Wu | G09G 5/003 |
| 2011/0216030 | A1* | 9/2011 | Lee | G06F 3/041 |
| | | | | 345/174 |
| 2013/0155006 | A1* | 6/2013 | Li | G06F 3/044 |
| | | | | 345/174 |
| 2014/0078104 | A1* | 3/2014 | Lee | G06F 3/044 |
| | | | | 345/174 |
| 2015/0185048 | A1* | 7/2015 | Liu | G01D 5/20 |
| | | | | 345/174 |
| 2015/0185905 | A1* | 7/2015 | Ma | G06F 3/044 |
| | | | | 345/174 |

(Continued)

FOREIGN PATENT DOCUMENTS

KR 10-2015-0135565 A 12/2015

*Primary Examiner* — Patrick F Marinelli
(74) *Attorney, Agent, or Firm* — Sughrue Mion, PLLC (57) ABSTRACT

A digitizer in which a touch sensing electrode of a self-capacitive type touch sensor and a first electrode of the digitizer are formed on the same layer is provided. The digitizer according to the present invention has a high level of pressure sensing and a simplified manufacturing process.

17 Claims, 4 Drawing Sheets

(56) References Cited

U.S. PATENT DOCUMENTS

| | | | |
|---|---|---|---|
| 2015/0185928 A1* | 7/2015 | Son | G06F 3/016 |
| | | | 345/174 |
| 2015/0227254 A1* | 8/2015 | Kim | G06F 3/0416 |
| | | | 345/174 |
| 2016/0041677 A1* | 2/2016 | Tahara | G06F 3/0416 |
| | | | 345/174 |
| 2016/0124562 A1* | 5/2016 | Lu | G06F 3/0412 |
| | | | 345/174 |
| 2016/0139701 A1* | 5/2016 | Wang | G06F 3/044 |
| | | | 345/174 |
| 2016/0179266 A1* | 6/2016 | Yang | G06F 3/044 |
| | | | 345/174 |
| 2016/0328055 A1* | 11/2016 | Wu | G09G 5/003 |
| 2016/0357306 A1* | 12/2016 | Zou | G02F 1/13338 |
| 2018/0246595 A1* | 8/2018 | Chae | G06F 3/0416 |
| 2018/0246608 A1* | 8/2018 | Huh | G06F 3/0412 |

\* cited by examiner

DIGITIZER AND METHOD OF PREPARING THE SAME

CROSS REFERENCE TO RELATED APPLICATIONS

This application claims priority based on Korean Patent Application No. 10-2017-0026152, filed Feb. 28, 2017, the content of which is incorporated herein by reference in its entirety.

TECHNICAL FIELD

The present invention relates to a digitizer and a method of preparing the same. Particularly, the present invention relates to a digitizer that can be integrated with a touch sensor and a method of preparing the same.

BACKGROUND ART

In recent display devices, a touch input method in which a user directly touches a screen using a finger or an electronic pen to input is widely used. As such a touch input method can be combined with a display screen without a separate input device such as a keyboard or a mouse, it is advantageously used for a portable terminal such as a smart phone, a notebook computer, and a tablet PC.

In general, a capacitive touch sensor in which a user performs input using a finger is advantageous in that it is intuitive and simple, but there is a limitation in specifying precise coordinates. Accordingly, a digitizer of an electromagnetic resonance (EMR) method using a pen is advantageously used for precise graphic input.

As an attempt to integrate these two input methods into one device, Korean Patent Laid-Open Publication No. 2015-0135565 discloses a touch panel comprising a transparent substrate divided into an active region and a bezel region; a touch sensing part formed on the active region of the transparent substrate and sensing a capacitance change; an insulation film formed on the upper surface of the touch sensing part and having a mesh pattern; and a metal pattern part formed on the upper surface of the insulation film and including an electrode having a mesh pattern and capable of receiving a signal transmitted from the outside or transmitting a power signal to the outside.

However, in the touch panel disclosed in Korean Patent Laid-Open Publication No. 2015-0135565, since a signal transmitted from the outside is received or a power signal is transmitted to the outside using one metal pattern part, the sensitivity is low and there is a possibility that noise is generated. Further, there is a problem of visibility due to a difference in transmittance between a portion where the metal pattern is formed and a portion where the metal pattern is not formed since the metal pattern forms a loop pattern overlapping with the touch sensing part.

DISCLOSURE OF INVENTION

Technical Problem

It is an object of the present invention to provide a digitizer which can be formed integrally with a touch sensor and has a high level of pressure sensing and a method of preparing the same.

It is another object of the present invention to provide a digitizer which can be formed integrally with a touch sensor and whose manufacturing process is simplified and a method of preparing the same.

It is still another object of the present invention to provide a flexible display device including the digitizer.

Technical Solution

According to an aspect of the present invention, there is provided a digitizer comprising: a substrate; a touch sensing electrode and a first digitizer electrode disposed on the substrate; an insulation layer formed on the touch sensing electrode and the first digitizer electrode and having a through hole exposing the first digitizer electrode; a second digitizer electrode formed on the insulation layer and a first digitizer electrode bridge formed on the insulation layer to be electrically connected to the first digitizer electrode via the through hole; and a passivation layer formed on the second digitizer electrode and the first digitizer electrode bridge.

The substrate may be a flexible substrate.

The second digitizer electrode and the first digitizer electrode bridge may be made of a metal.

The second digitizer electrode may not overlap with the touch sensing electrode.

The digitizer may further comprise a touch sensor trace disposed on the substrate.

The second digitizer electrode may be formed in a direction of a short axis of the digitizer, and the second digitizer electrode may be formed to have two or more loops in a longitudinal direction.

According to another aspect of the present invention, there is provided a flexible display device comprising: the abode-described digitizer and a display layer disposed under the digitizer.

According to yet another aspect of the present invention, there is provided a method of preparing a digitizer comprising the steps of: forming a touch sensing electrode and a first digitizer electrode on a substrate; forming an insulation layer having a through hole exposing the first digitizer electrode on the touch sensing electrode and the first digitizer electrode; forming a second digitizer electrode and a first digitizer electrode bridge electrically connected to the first digitizer electrode via the through hole on the insulation layer; and forming a passivation layer on the second digitizer electrode and the first digitizer electrode bridge.

Advantageous Effects

The digitizer according to the present invention has a high level of pressure detection, a simplified manufacturing process, and excellent visibility.

BEST MODE

Hereinafter, the present invention will be described in detail with reference to the accompanying drawings. However, the drawings accompanying the present disclosure are mere examples for describing the present invention, and the present invention is not limited by the drawings. Also, some elements may be exaggerated, scaled-down, or omitted in the drawings for clearer expressions.

The present invention provides a digitizer and a method of preparing the same in which a digitizer is formed integrally with a self-capacitive type touch sensor and it has a simplified manufacturing process while having a high level of pressure sensing.

Figure 1:
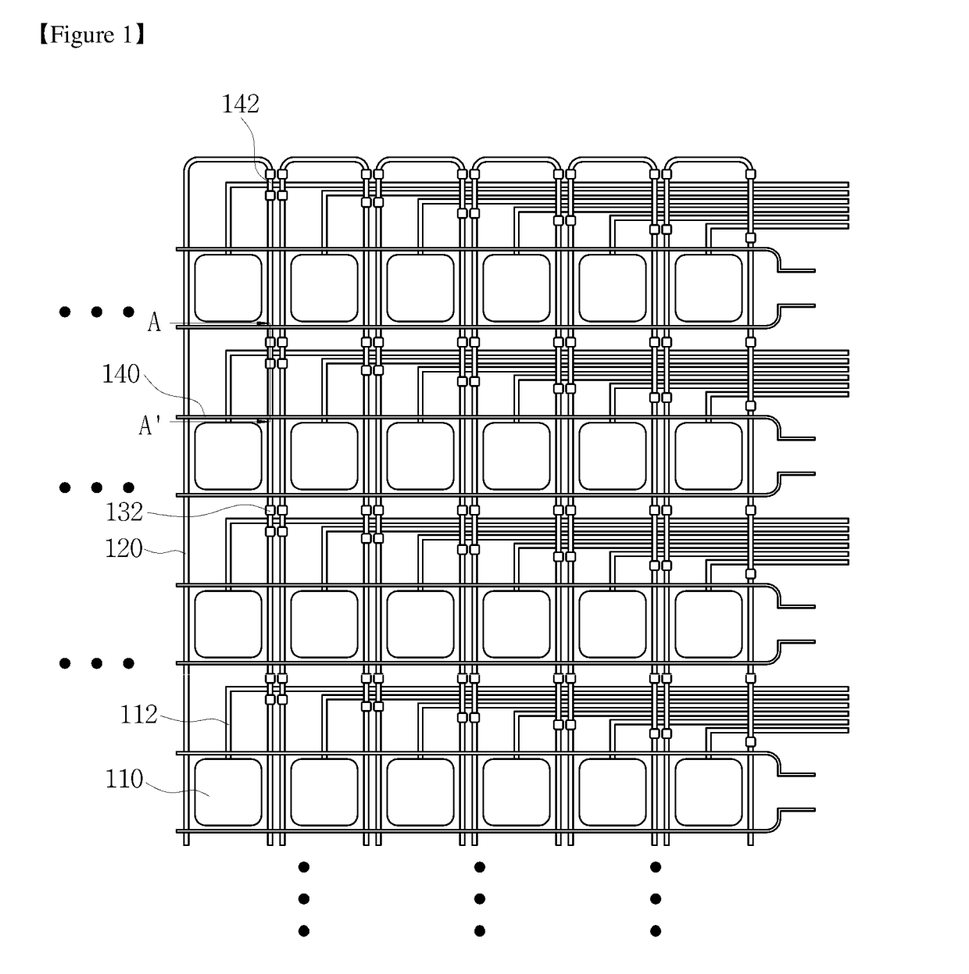
FIG. 1 is a plan view schematically illustrating a touch sensor integrated digitizer according to an embodiment of the present invention.
Figure 2:
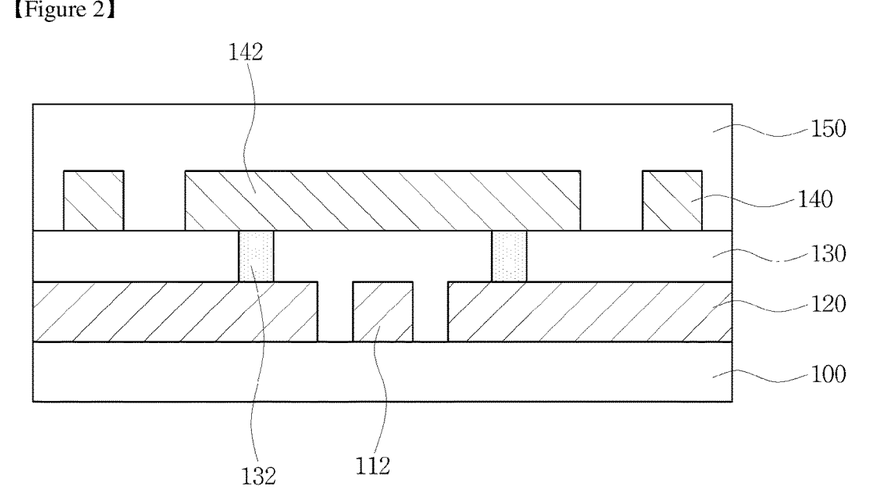
FIG. 2 is a cross-sectional view taken along the line A-A' of FIG. 1.

FIG. 1 is a plan view schematically illustrating a touch sensor integrated digitizer according to an embodiment of the present invention, and FIG. 2 is a cross-sectional view taken along the line A-A' of FIG. 1.

Referring FIGS. 1 and 2, a touch sensor integrated digitizer according to an embodiment of the present invention includes a touch sensing electrode 110 for sensing a touch and a touch sensor trace 112 electrically connecting each touch sensing electrode 110 to a wiring portion (not shown) of the touch sensor.

The touch sensor included in the touch sensor integrated digitizer according to an embodiment of the present invention is a self-capacitive type touch sensor that sets the capacitance of the touch sensing electrode itself as an initial value and recognizes a change in capacitance occurring in the touch sensing electrode as it is touched by a finger. As touch sensors become thinner recently, a mutual-capacitive type touch sensor that detects a change in capacitance formed between two electrodes has raised the possibility of a ghost phenomenon and has disadvantages such as adverse effect due to external noise. To overcome these disadvantages, the self-capacitive type is used as an alternative.

Accordingly, in the embodiment of the present invention as shown in FIGS. 1 and 2, all the touch sensing electrodes 110 and the touch sensor traces 112 are formed on the same layer.

Meanwhile, as illustrated in FIGS. 1 and 2, a first digitizer electrode 120 is formed on the same layer as the touch sensing electrode 110 and the touch sensor trace 112 in a longitudinal direction.

That is, the touch sensing electrode 110, the touch sensor trace 112, and the first digitizer electrode 120 are all formed in the same layer. Accordingly, the first digitizer electrode 120 should be formed so as not to overlap with the touch sensing electrode 110 or the touch sensor trace 112. For this purpose, the first digitizer electrode 120 is located at the outer periphery of each touch sensing electrode 110, and a portion of the first digitizer electrode 120 passing through the touch sensor trace 112 is connected through a digitizer electrode bridge 142 not to overlap with the touch sensor trace 112, which will be described later.

In an embodiment of the present invention, the first digitizer electrode 120 is used as a receiver part of the digitizer.

Materials and shapes of the touch sensing electrode 110, the touch sensor trace 112, and the first digitizer electrode 120 may be any of materials and shapes used in general touch sensors and digitizers, and are not particularly limited in the present invention.

For example, the touch sensing electrode 110, the touch sensor trace 112, and the first digitizer electrode 120 may be formed of a transparent conductive film material, and may be formed of at least one selected from metal, metal mesh, metal nanowire, metal oxide, carbon nanotube, graphene, conductive polymer, and conductive ink.

Here, the metal may be any one of gold, silver, copper, nickel, chromium, molybdenum, aluminum, palladium, neodymium, platinum, zinc, tin, titanium and alloys thereof.

The metal nanowire can be any one of silver nanowire, copper nanowire, zirconium nanowire, and gold nanowire.

The metal oxide may be selected from the group consisting of indium tin oxide (ITO), indium zinc oxide (IZO), indium zinc tin oxide (IZTO), aluminum zinc oxide (AZO), gallium zinc oxide (GZO), fluorine tin oxide (FTO) and zinc oxide (ZnO).

Also, the touch sensing electrode 110, the touch sensor trace 112, and the first digitizer electrode 120 may be formed of a carbon-based material including carbon nanotube (CNT) and graphene.

The conductive polymer may include polypyrrole, polythiophene, polyacetylene, PEDOT, or polyaniline. The conductive ink includes a mixture of a metal powder and a curable polymeric binder.

In addition, the touch sensing electrode 110, the touch sensor trace 112, and the first digitizer electrode 120 may have a stacked structure of two or more conductive layers in order to reduce electrical resistance.

As an embodiment, the touch sensing electrode 110, the touch sensor trace 112, and the first digitizer electrode 120 may be formed as a single layer of ITO, AgNW (silver nanowire), or metal mesh. In the case of forming two or more layers, the first electrode layer may be formed of a transparent metal oxide such as ITO, and the second electrode layer may be formed on the ITO electrode layer using metal, AgNW, or the like to further reduce the electrical resistance.

The touch sensing electrode 110, the touch sensor trace 112 and the first digitizer electrode 120 are formed on the substrate 100.

In an embodiment of the present invention, the substrate 100 may be a flexible film substrate, especially a transparent film.

The transparent film is not limited if it has good transparency, mechanical strength and thermal stability. Specific examples of the transparent film may include thermoplastic resins, e.g., polyester resins such as polyethylene terephthalate, polyethylene isophthalate, polyethylene naphthalate and polybutylene terephthalate; cellulose resins such as diacetylcellulose and triacetylcellulose; polycarbonate resins; acrylate resins such as polymethyl (meth)acrylate and polyethyl (meth)acrylate; styrene resins such as polystyrene and acrylonitrile-styrene copolymer; polyolefin resins such as polyethylene, polypropylene, polyolefin having a cyclic or norbornene structure, and ethylene-propylene copolymer; vinyl chloride resins; amide resins such as nylon and aromatic polyamide; imide resins; polyethersulfone resins; sulfone resins; polyether ether ketone resins; polyphenylene sulfide resins; vinyl alcohol resins; vinylidene chloride resins; vinyl butyral resins; allylate resins; polyoxymethylene resins; and epoxy resins. Also, a film consisting of a blend of the thermoplastic resins may be used. In addition, thermally curable or UV curable resins such as (meth)acrylate, urethane, acrylic urethane, epoxy and silicon resins may be used.

Such a transparent film may have a suitable thickness. For example, considering workability in terms of strength and handling, and thin layer property, the thickness of the transparent film may range from 1 to 500 μm, preferably 1 to 300 μm, more preferably 5 to 200 μm.

The transparent film may contain at least one suitable additive. Examples of the additive may include an UV absorber, an antioxidant, a lubricant, a plasticizer, a releasing agent, a coloring-preventing agent, an anti-flame agent, an anti-static agent, a pigment and a colorant. The transparent film may comprise various functional layers including a hard coating layer, an anti-reflective layer and a gas barrier layer, but the present invention is not limited thereto. That is, other functional layers may also be included depending on the desired use.

If necessary, the transparent film may be surface-treated. For example, the surface treatment may be carried out by drying method such as plasma, corona and primer treatment, or by chemical method such as alkali treatment including saponification.

Also, the transparent film may be an isotropic film, a retardation film or a protective film.

In the case of the isotropic film, it is preferred to satisfy an in-plane retardation (Ro) of 40 nm or less, preferably 15 nm or less and a thickness retardation (Rth) of −90 nm to +75 nm, preferably −80 nm to +60 nm, particularly −70 nm to +45 nm, the in-plane retardation (Ro) and thickness retardation (Rth) being represented by the following equations.

$$Ro=[(nx-ny)*d]$$

$$Rth=[(nx+ny)/2-nz]*d$$

wherein, nx and ny are each a main refractive index in a film plane, nz is a refractive index in the thickness direction of film, and d is a thickness of film.

The retardation film may be prepared by uniaxial stretching or biaxial stretching of a polymer film, coating of a polymer or coating of a liquid crystal, and it is generally used for improvement or control of optical properties, e.g., viewing angle compensation, color sensitivity improvement, light leakage prevention, or color control of a display.

The retardation film may include a half-wave (½) or quarter-wave (¼) plate, a positive C-plate, a negative C-plate, a positive A-plate, a negative A-plate, and a biaxial plate.

The protective film may be a polymer resin film comprising a pressure-sensitive adhesive (PSA) layer on at least one surface thereof, or a self-adhesive film such as polypropylene, which may be used for protection of the digitizer surface or improvement of processibility.

An insulation layer 130 is formed on the touch sensing electrode 110, the touch sensor trace 112, and the first digitizer electrode 120.

The insulation layer 130 may be formed of an organic insulation layer or an inorganic insulation layer, and a through hole 132 may be formed in the insulation layer 130 to connect the first digitizer electrode 120 using a bridge to form an electrode loop.

On the insulation layer 130 are formed a second digitizer electrode 140 shown in FIG. 1 in a lateral direction and a first digitizer electrode bridge 142 electrically connecting the first digitizer electrodes 120.

The second digitizer electrode 140 is an electrode used as a transmitter part of the digitizer in an embodiment of the present invention, and is preferably made of a metal to achieve a low resistance. In addition, the second digitizer electrode 140 may be formed on the outer periphery of the touch sensing electrode 110 so as not to overlap with the touch sensing electrode 110 for visibility.

Examples of the metal material constituting the second digitizer electrode 140 include gold (Au), silver (Ag), copper (Cu), molybdenum (Mo), nickel (Ni), chromium (Cr), silver-palladium-copper alloy (Ag/Pd/Cu, APC), without limitation.

In the embodiment of the present invention shown in FIGS. 1 and 2, the first digitizer electrode 120 used as a receiver part is formed in a longitudinal direction in a lower part of the digitizer, and the second digitizer electrode 140 used as a transmission part is formed in a lateral direction in an upper part of the digitizer. However, the positions and directions of the first and second digitizer electrodes are not limited thereto.

However, the structure described above may be preferable because the transmitter part of the digitizer is closer to the pen and the electrode loop is shorter, which is advantageous for sensing the pressure.

A passivation layer 150 is formed on the second digitizer electrode 140 and the first digitizer electrode bridge 142.

The passivation layer may be formed of, for example, a polycycloolefin-based material, and may have a thickness of 0.5 to 5 µm.

As the length of the electrode loop forming the transmitter part of the digitizer is shorter, the level of the pressure sensing increases. In this regard, the shape of the electrode loop can be variously modified. For example, the electrode loop formed in the transverse direction may be divided into two portions to form two loops, respectively.

Figure 3:
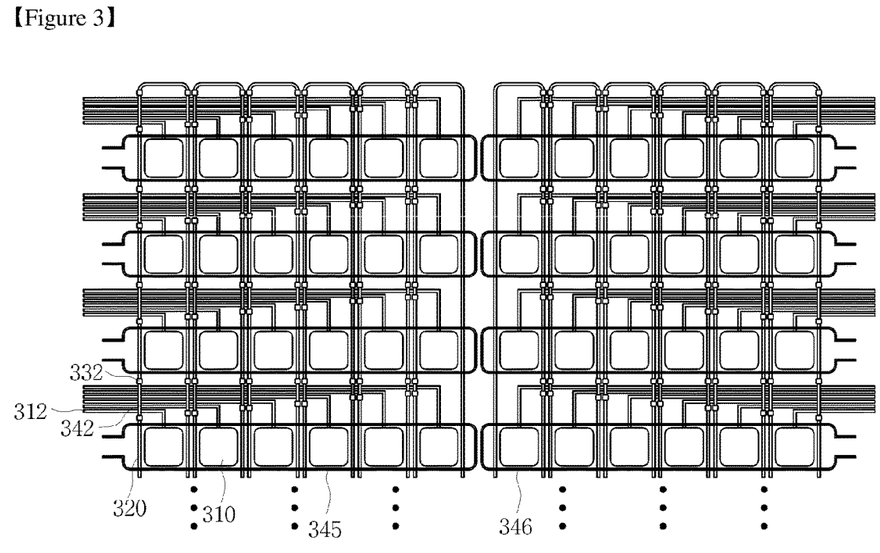
FIG. 3 is a plan view schematically illustrating a touch sensor integrated digitizer according to another embodiment of the present invention.

FIG. 3 is a plan view of a touch sensor integrated digitizer according to another embodiment of the present invention in which the electrode loop of the transmitter part is divided into two portions.

According to another embodiment of the present invention, a touch sensing electrode 310, a touch sensor trace 312, and a first digitizer electrode 320 are formed on a substrate (not shown), and an insulation layer (not shown) having a through hole 332 is formed thereon. On the insulation layer are formed second digitizer electrodes 345 and 346 and a first digitizer electrode bridge 342.

The remaining components except for the second digitizer electrodes 345 and 346 are similar to those of the embodiment of the present invention described with reference to FIGS. 1 and 2, so a detailed description thereof will be omitted.

Referring to FIG. 3, in another embodiment of the present invention, the second digitizer electrodes 345 and 346 are configured so as to form two electrode loops in a lateral direction. This is to increase the power intensity and sensitivity of the transmitter part by reducing the length of the electrode loop of the transmitter part and increasing the number of loops, which may be advantageous for increasing the level and resolution of the pressure sensing.

According to another aspect of the present invention, there is provided a flexible display device including the digitizer as described above.

The flexible display device according to the present invention may include a digitizer according to any one of the embodiments of the present invention shown in FIGS. 1 to 3 and a display layer disposed under the digitizer.

Now, a method for preparing a touch sensor integrated digitizer according to an embodiment of the present invention will be described in detail.

According to the present invention, the touch sensing electrode of the self-capacitive type touch sensor is formed on the same layer as the first digitizer electrode so that the touch sensor integrated digitizer can be prepared without any additional process.

The touch sensor integrated digitizer of the present invention may be formed directly on a substrate. Or, it may be prepared using a carrier substrate to form a touch sensor integrated digitizer, and then the carrier substrate may be separated and a substrate film may be attached.

In this specification, a method of forming a digitizer directly on a substrate will be mainly described. FIGS. 4a to 4e are sectional views of a method of preparing a digitizer according to an embodiment of the present invention.

Figure 4A:
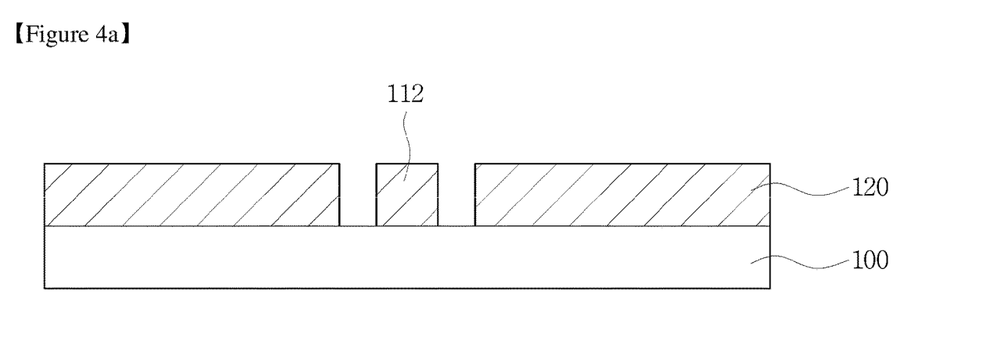
FIGS. 4a to 4e are sectional views of a method of preparing a touch sensor integrated digitizer according to an embodiment of the present invention.

As shown in FIG. 4a, a transparent conductive film is formed on the substrate 100 and patterned to form a touch sensing electrode (not shown), a touch sensor trace 112, and a first digitizer electrode 120. The patterning of the transparent conductive film can be performed through a photolithography process using a photosensitive resist.

The transparent conductive film may be formed by a sputtering process such as CVD (Chemical Vapor Deposition), PVD (Physical Vapor Deposition), PECVD (Plasma Enhanced Chemical Vapor Deposition), a printing process such as screen printing, gravure printing, reverse offset, inkjet, or dry or wet plating process. In the case of depositing by a sputtering process, a mask having a desired electrode pattern shape is disposed on a substrate and a sputtering process is performed to form an electrode pattern layer. Alternatively, a conductive layer may be formed on the entire surface by the above-described film forming method, and an electrode pattern layer may be formed by using a photolithography process.

The photosensitive resist may be a negative type photosensitive resist or a positive type photosensitive resist.

Figure 4B:
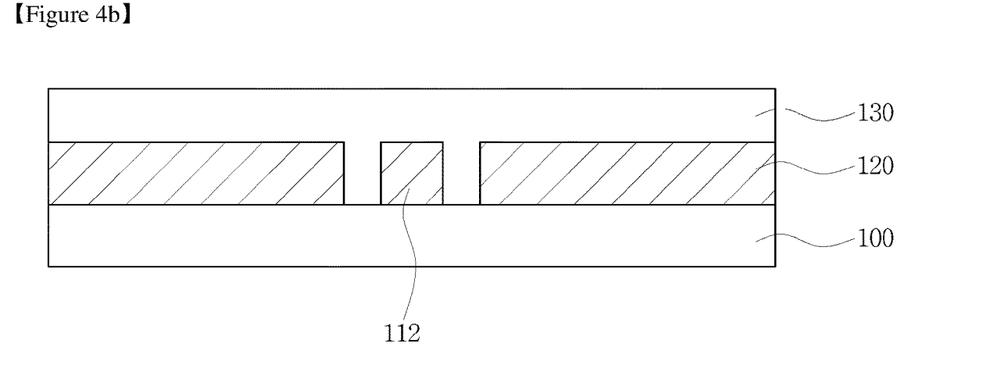
Figure 4C:
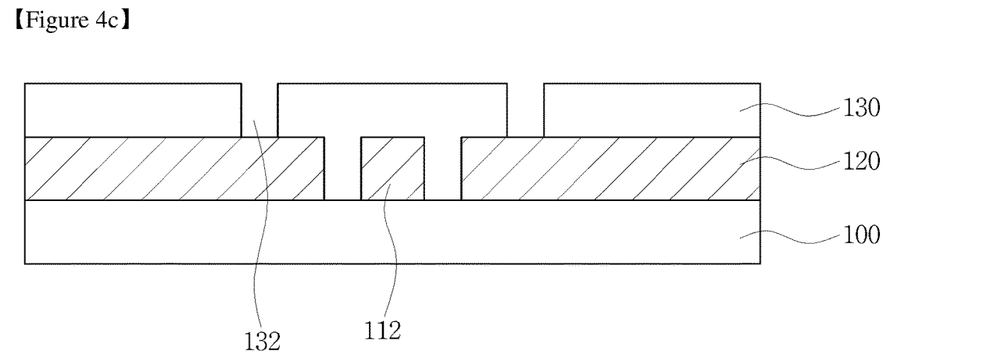

Next, as shown in FIG. 4b, an insulation layer 130 is applied, and it is patterned to form a through hole 132 exposing the first digitizer electrode 120, as shown in FIG. 4c.

As the method of applying the insulation layer 130, a known coating method may be used. For example, spin coating, die coating, spray coating, roll coating, screen coating, slit coating, dip coating, gravure coating and the like can be used.

Figure 4D:
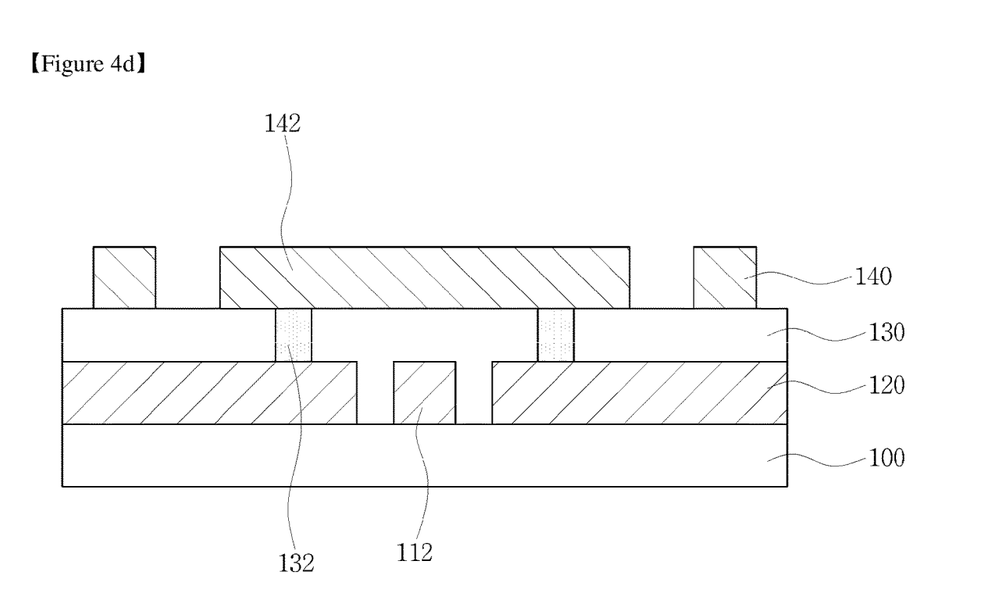

Then, as shown in FIG. 4d, a second digitizer electrode 140 and a first digitizer electrode bridge 142 are formed by patterning the metal material as described above. The metal layer may be deposited by a process such as CVD, PVD and PECVD, but is not limited thereto.

Figure 4E:
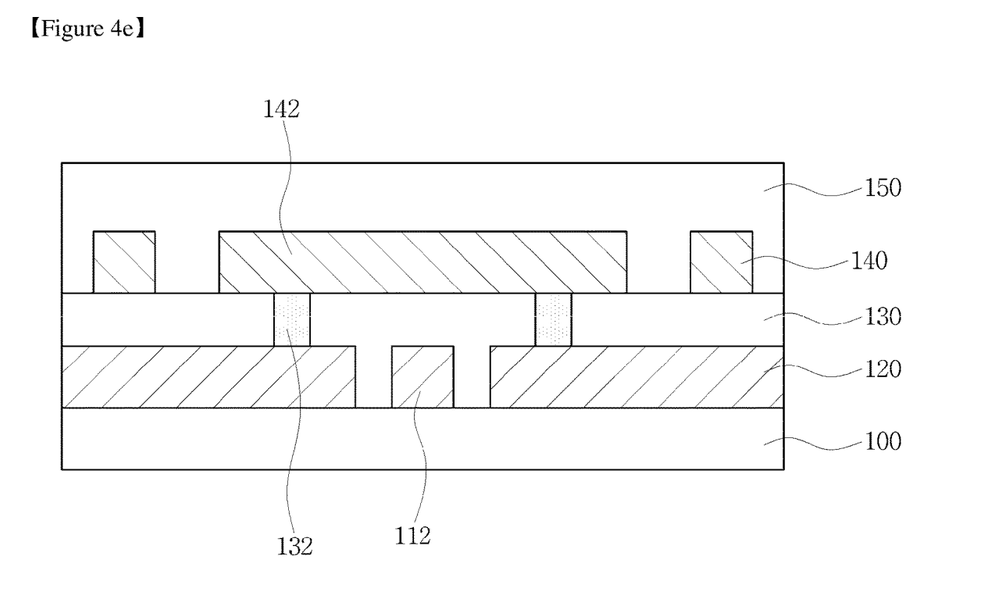

Next, as shown in FIG. 4e, a passivation layer 150 is formed on the entire upper surface of the second digitizer electrode 140 and the first digitizer electrode bridge 142.

On the other hand, in order to overcome process difficulties that occur when a flexible substrate is used, a process may be performed using a carrier substrate, and the digitizer may be transferred on a flexible film substrate to implement a flexible digitizer.

In this case, a common process using a carrier substrate can be used without any particular limitation, and a detailed description thereof will be omitted. However, it will be easily deduced by a person skilled in the art based on the above-described process of forming on a flexible substrate.

Although particular embodiments and examples of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

DESCRIPTION OF REFERENCE NUMERALS

100: substrate
110, 310: touch sensing electrode
112, 312: touch sensor trace
120, 320: first digitizer electrode
130: insulation layer
132, 332: through hole
140, 345, 346: second digitizer electrode
142, 342: first digitizer electrode bridge
150: passivation layer

The invention claimed is:

1. A digitizer comprising:
a substrate;
a plurality of touch sensing electrodes, a plurality of touch sensor traces, and a plurality of first digitizer electrodes disposed directly on the substrate;
an insulation layer formed directly on the plurality of touch sensing electrodes and the plurality of first digitizer electrodes and having through holes exposing the plurality of first digitizer electrodes;
a plurality of second digitizer electrodes formed directly on the insulation layer and a plurality of first digitizer electrode bridges formed directly on the insulation layer to be electrically connected to one of the plurality of first digitizer electrodes via two of the plurality of through holes; and
a passivation layer formed directly on the plurality of second digitizer electrodes and the plurality of first digitizer electrode bridges,
wherein each first digitizer electrode surrounds a column of touch sensing electrodes, and each second digitizer electrode surrounds a row of touch sensing electrodes,
wherein the first digitizer electrode bridges overlap the plurality of touch sensor traces, and
wherein the plurality of touch sensing electrodes are of the self-capacitive type touch sensor, and the plurality of first digitizer electrodes and the plurality of second digitizer electrodes are of an electro-magnetic resonance (EMR) method.

2. The digitizer of claim 1, wherein the substrate is a flexible substrate.

3. A display device comprising:
a digitizer according to claim 2; and
a display layer disposed under the digitizer.

4. The digitizer of claim 1, wherein the second digitizer electrode and the first digitizer electrode bridge are made of a metal.

5. A display device comprising:
a digitizer according to claim 4; and
a display layer disposed under the digitizer.

6. The digitizer of claim 1, wherein the second digitizer electrode does not overlap with the touch sensing electrode.

7. A display device comprising:
a digitizer according to claim 6; and
a display layer disposed under the digitizer.

8. The digitizer of claim 1, wherein the second digitizer electrode is formed in a direction of a short axis of the digitizer.

9. The digitizer of claim 1, wherein the second digitizer electrode is formed to have two or more loops in a longitudinal direction.

10. A display device comprising:
a digitizer according to claim 9; and
a display layer disposed under the digitizer.

11. A display device comprising:
a digitizer according to claim 1; and
a display layer disposed under the digitizer.

12. A method of preparing a digitizer comprising the steps of:
- forming a plurality of touch sensing electrodes, a plurality of touch sensor traces, and a plurality of first digitizer electrodes directly on a substrate;
- forming an insulation layer having a plurality of through holes exposing the plurality of first digitizer electrodes directly on the touch sensing electrode and the plurality of first digitizer electrodes;
- forming a plurality of second digitizer electrodes and a plurality of first digitizer electrode bridges electrically connected to one of the plurality of first digitizer electrodes via two of the plurality of through holes directly on the insulation layer; and
- forming a passivation layer directly on the plurality of second digitizer electrode and the plurality of first digitizer electrode bridges,
- wherein each first digitizer electrode surrounds a column of touch sensing electrodes, and each second digitizer electrode surrounds a row of touch sensing electrodes,
- wherein the first digitizer electrode bridges overlap the plurality of touch sensor traces, and
- wherein the plurality of touch sensing electrodes are of the self-capacitive type touch sensor, and the plurality of first digitizer electrodes and the plurality of second digitizer electrodes are of an electro-magnetic resonance (EMR) method.

13. The method of claim 12, wherein the substrate is a flexible substrate.

14. The method of claim 12, wherein the second digitizer electrode and the first digitizer electrode bridge are formed of a metal.

15. The method of claim 12, wherein the second digitizer electrode is formed not to overlap with the touch sensing electrode.

16. The method of claim 12, wherein the second digitizer electrode is formed in a direction of a short axis of the digitizer.

17. The method of claim 12, wherein the second digitizer electrode is formed to have two or more loops in the longitudinal direction.

* * * * *